United States Patent [19]

Pinard

[11] Patent Number: 5,491,746
[45] Date of Patent: Feb. 13, 1996

[54] UNIQUE RINGING ON A PRIME TELEPHONE

[75] Inventor: Deborah L. Pinard, Kanata, Canada

[73] Assignee: Mitel Corporation, Canada

[21] Appl. No.: 207,958

[22] Filed: Mar. 8, 1994

[30] Foreign Application Priority Data

Mar. 9, 1993 [CA] Canada ................................. 2091278

[51] Int. Cl.⁶ ........................................... H04M 13/00
[52] U.S. Cl. ........................ 379/373; 379/375; 379/418; 379/252; 379/253
[58] Field of Search .................................. 379/373, 374, 379/375, 171, 172, 173, 174, 180, 181, 182, 183, 252, 255

[56] References Cited

U.S. PATENT DOCUMENTS

| | | | |
|---|---|---|---|
| 4,477,697 | 10/1984 | Judd et al. | 379/252 |
| 4,615,028 | 9/1986 | Lewis et al. | 370/58 |
| 4,962,527 | 10/1990 | Burns et al. | 379/255 |
| 5,142,569 | 8/1992 | Peters et al. | 379/373 |
| 5,361,296 | 11/1994 | Reyes et al. | 379/373 |

FOREIGN PATENT DOCUMENTS

| | | | |
|---|---|---|---|
| 4042920 | 10/1992 | Japan | 379/252 |
| 2256775 | 12/1992 | United Kingdom | H04M 19/04 |

*Primary Examiner*—Jeffery A. Hofsass
*Assistant Examiner*—Jacques M. Saint-Surin
*Attorney, Agent, or Firm*—Charles E. Wands

[57] ABSTRACT

A telephone switching system is comprised of a main controller, switching circuits controlled by the main controller, a peripheral controller for controlling the seizing of subscriber lines for calls routed through the switching circuits, and further comprising a first memory associated with and accessible by the main controller for storing user data associated with each directory number, the user data comprising a ring type, a second memory associated with the peripheral controller for storing ringing cadence indicators associated with respective plural ring types, the main controller for reading the station data from the first memory upon receiving a request for service to a directory number, and sending the ring type indicator with a subscriber line seize message to the peripheral controller, the peripheral controller for reading the second memory and obtaining the ring cadence indicators associated with the ring type, and ringing a line according to the indicated ring cadence.

7 Claims, 3 Drawing Sheets

UNIQUE RINGING ON A PRIME TELEPHONE

FIELD OF THE INVENTION

This invention relates to telephone systems and in particular to a method and apparatus for ringing one or plural telephone lines associated with a single subscriber with different ring cadences.

BACKGROUND TO THE INVENTION

Certain subscribers have more than one telephone line, and telephone sets connected to them which are within ringing hearing range of each other. For example, some homes have a main telephone line and a second telephone line for teenage children. When the telephones associated with those lines ring, it is usually difficult to tell which of the telephone lines is ringing. Sometimes different kinds of telephones are purchased for connection to the different lines, the different telephone sets exhibiting different sounds. For example, the telephone sets connected to one telephone line may have a bell, while those connected to the second telephone line may have electronic ringing. In this way the subscribers can tell which of the lines is ringing, and the appropriate person answer the call. This of course imposes severe restrictions on the mixing and matching of telephones and telephone sets having special features.

In addition, as described in Canadian patent application serial number 2,081,125 filed Oct. 22, 1992, invented by Deborah L. Pinard and Graham Wilson, a subscriber may invoke a call transfer to another line which may be on the same or on a different switching system. Calls to that subscriber are automatically rung on a different line. However there is no way to distinguish whether a call rung on the target line is intended for the subscriber registered against that line, or for the call designated for the transfer subscriber.

Some current switching systems allow a single subscriber to have different directory numbers which terminate on the same line, a call to either resulting in a different ringing cadence. In addition, party lines allow different ringing to occur on the same line. The same telephone set or sets connected to the single line are all rung with the different ringing cadences. However neither of these solve the problems identified above, since the different directory numbers are registered to a single subscriber, and ring only a single line which can be used at a time, or are registered to different subscribers, but again ring only a single line.

SUMMARY OF THE INVENTION

The present invention provides a method and structure for providing different ringing cadences to provide different, selectable ringing cadences to a particular single telephone line which is registered to a single subscriber, the cadence being identified by a directory number different from the directory number registered to that line. This allows a call transferred to that telephone to be rung using a different cadence, identifying a call to the subscriber which has initiated a call transfer.

It also provides for selectable different ringing cadences to be applied to different telephone lines leading to telephones which are sufficiently close to each other that a single person can hear both ring from a single location, as may be found in a private home having two telephone lines and plural telephone sets located around the residence, or as may be found in an office having plural professionals, each having a separate line, with or without line equivalence, the lines being answerable by the separate professionals or by a single receptionist.

Thus calls to either line may be distinguished one from the other by the ringing cadences. Further, calls transferred from a remote telephone line may be distinguished from calls meant for the registered subscriber of a particular line.

In addition, the ringing cadences are easily selectable so that the subscriber can select whatever ringing cadences are desired for the particular telephone line used.

In accordance with an embodiment of the invention, a method of ringing a telephone is comprised of receiving a request for service to a first telephone line, the request being identified by a first directory number; looking up in a table containing a plurality of ringing sequences, a first particular ringing sequence allocated to the first directory number, applying the first particular ringing sequence to a subscriber's line which terminates at a first telephone to ring the first telephone in the first particular ringing sequence.

In accordance with another embodiment, a method of ringing a telephone from a central processor controlled switching system is comprised of storing in a first memory accessible by a central control of the switching system a ringing type indicator associated with a particular telephone line identified by a directory number, storing in a second memory accessible by a peripheral control of the switching system a group of different ringing cadence indicators, the central control receiving a request for service to a first telephone line, the central control reading the first memory and obtaining a ringing type indicator associated with the first telephone line, the central control sending a seize message to the peripheral control with an identification of the ring type, the peripheral control reading the second memory, obtaining ringing cadence indicators corresponding to the ring type, and ringing the first telephone line using an identified ringing cadence.

In accordance with another embodiment, a telephone switching system comprised of a main controller, switching circuits controlled by the main controller, a peripheral controller for controlling the seizing of subscriber lines for calls routed through the switching circuits, is further comprised of a first memory associated with and accessible by the main controller for storing user data associated with each directory number, the user data comprising a ring type, a second memory associated with the peripheral controller for storing ringing cadence indicators associated with each ring type, the main controller for reading the station data from the first memory upon receiving a request for service to a directory number, and sending the ring type indicated with a seize message to the peripheral controller, the peripheral controller for reading the second memory and obtaining the ring cadence indicators associated with the ring type, and ringing a line according to the indicated ring cadence.

BRIEF INTRODUCTION TO THE DRAWINGS

A better understanding of the invention will be obtained by reference to the detailed description below, in conjunction with the following drawings, in which:

FIG. 1 is a block diagram illustrating a telephone switching system containing the invention, FIG. 2 illustrates the content of memories used in the preferred embodiment, and FIG. 3 is a schematic of the process used in the preferred embodiment.

DETAILED DESCRIPTION OF THE INVENTION

Figure 1:
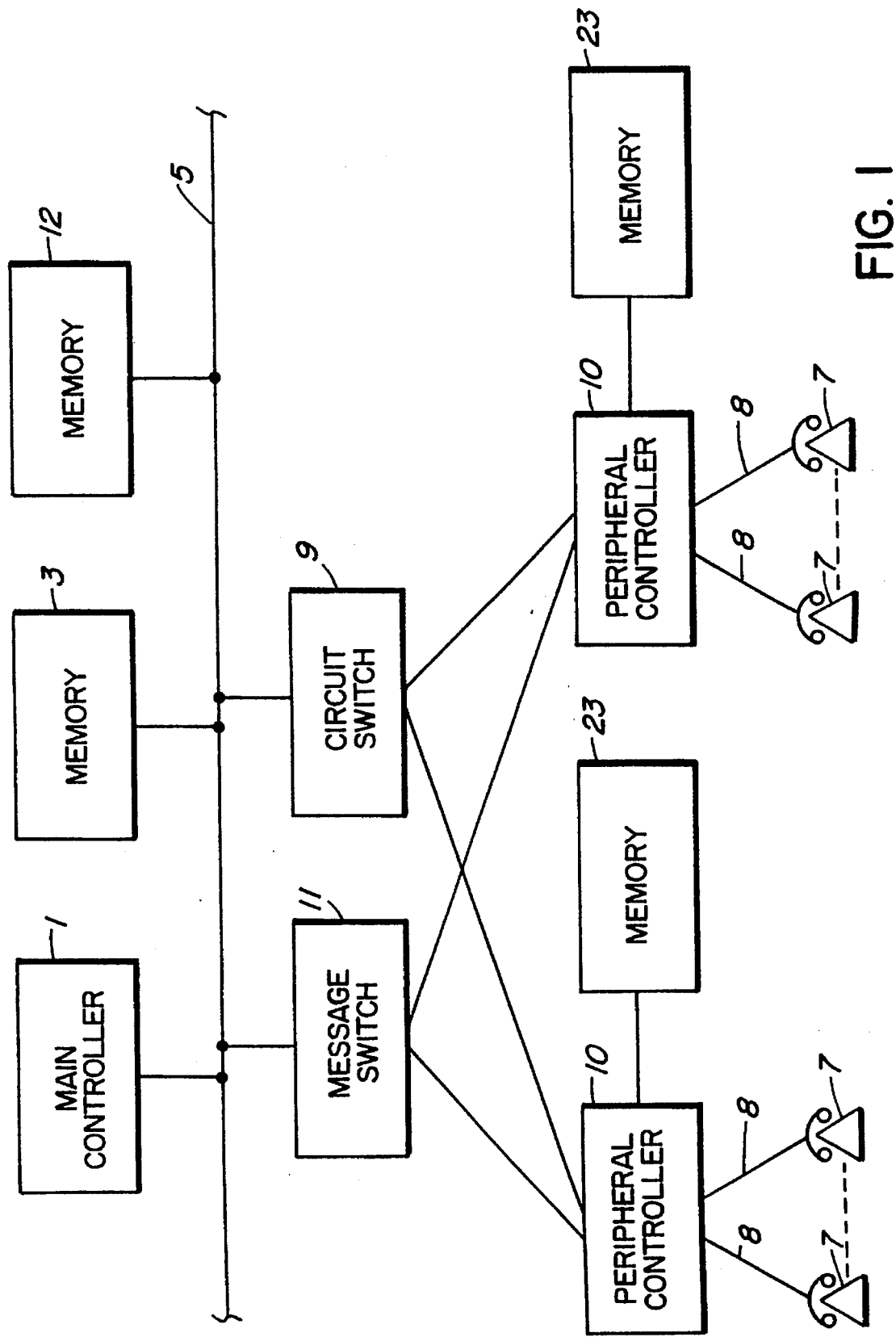

FIG. 1 illustrates in block diagram a telephone switching system of general type, for example as sold by Mitel Corporation under the type number SX2000. This system is described for example in U.S. Pat. No. 4,615,028 issued Sep. 30, 1986 invented by Conrad Lewis et al.

The system is comprised of a main controller 1 and a memory 3 which contains the operation programs for the switching system. The main controller accesses memory 3 via a bus 5.

Various telephone sets 7 are connected via lines 8 to line circuits (not shown) which are controlled by peripheral controller 10. Communication paths between telephone sets 7 pass through circuit switch 9, which is connected between peripheral controllers 10, circuit switch 9 being controlled by main controller 1 via bus 5. The main controller 1 sends controlling messages to peripheral controller 10 via message switch 11, which is connected to bus 5 and peripheral controller 9.

Figure 2:
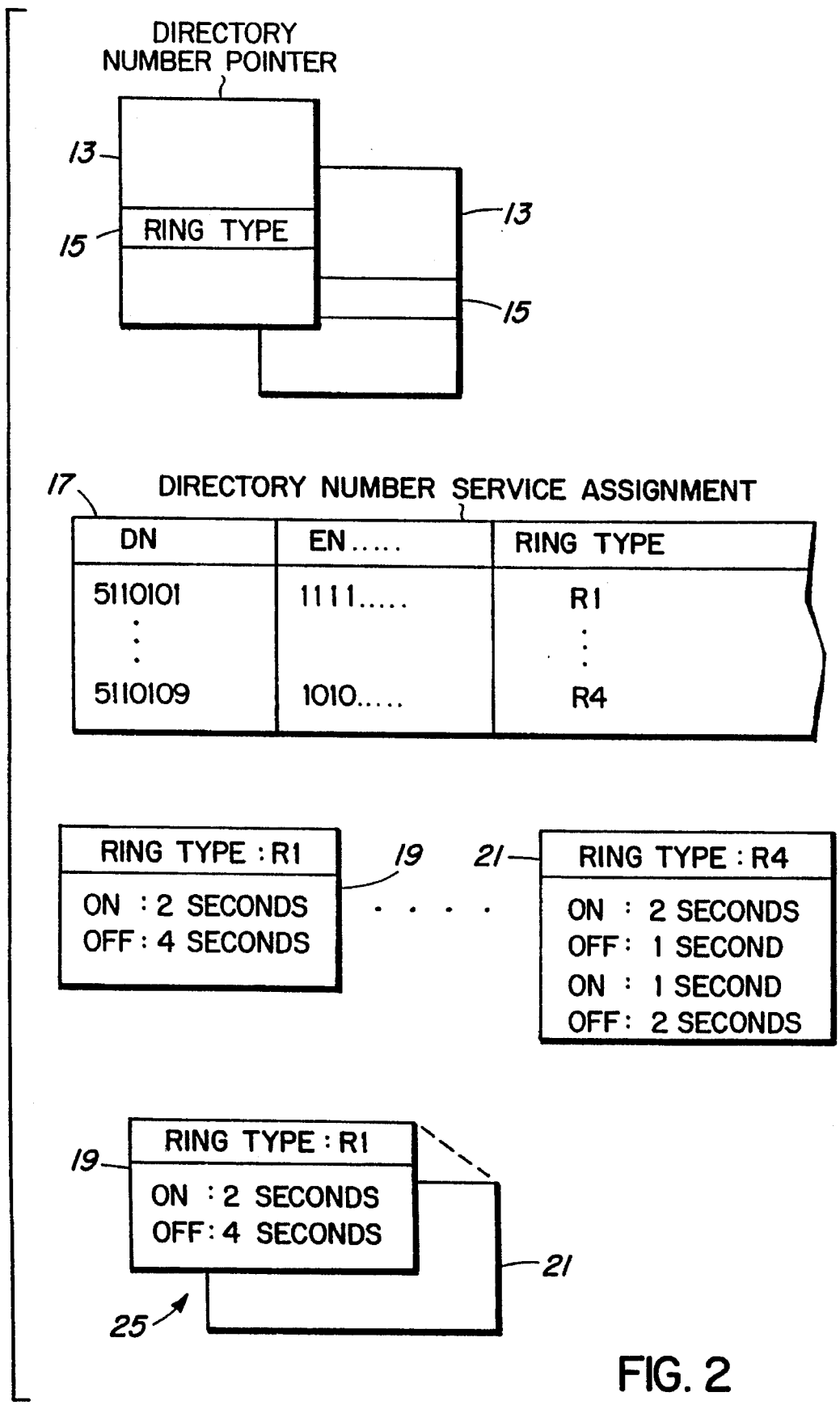

In accordance with the present invention a memory 12 is provided which is accessible by controller 1 via bus 5. The memory 12 contains tables 13 (FIG. 2) of user data, with one of the elements of the user data being a ring type 15 for that directory number. An expansion of a table is shown at 17, which is a directory number service assignment. For example, directory number 5110101 has ring type R1 associated with it, while directory number 5110109 has ring type R4 associated with it.

Also stored in memory 13 are the characteristics of the ring types. For example 19 illustrates ring type R1 as "ringing on" for two seconds and "ringing off" for four seconds, while 21 illustrates ring type R4 as having the "ringing on" for two seconds, "ringing off" for one second, on for one second, and off for two seconds.

Associated with peripheral controller 9 is memory 23. Memory 23 will store the ringing cadences (e.g. 19 and 21) as shown at 25, indexed by ring type.

When the directory numbers are initialized at the switching system, the ring types 19 ... 21 are accessed by the main controller from memory 12, and are transmitted via bus 5, message switch 11 and peripheral controller 10 to be stored in random access memory 23, indexed by ring type.

Figure 3:
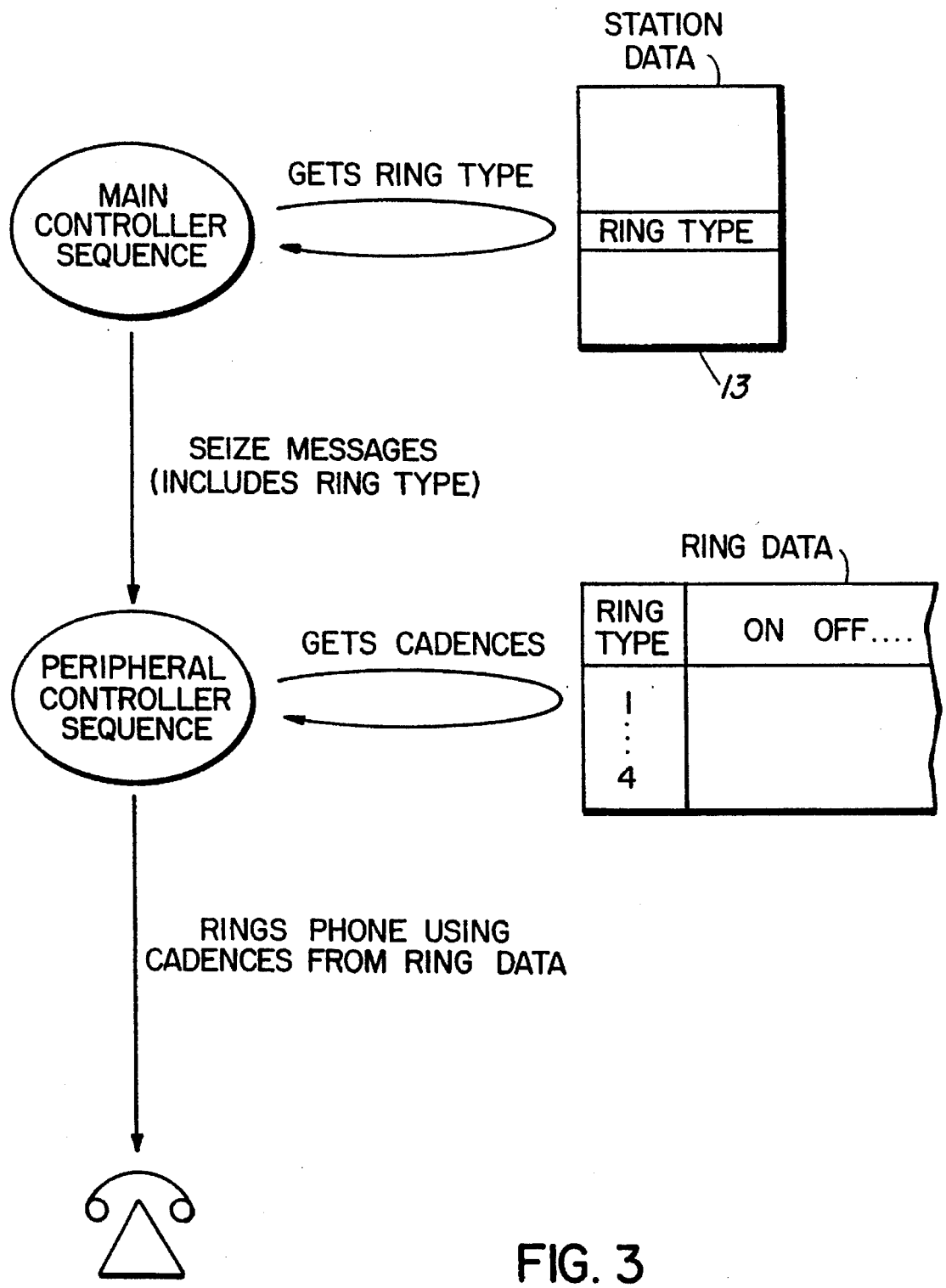

With reference to FIG. 3, when the main controller receives a request for service, it accesses memory 12, and in particular the table 13 of data pointed to by the directory number. It then sends a seized message via message switch 11 to the peripheral controller 10 to seize a particular telephone line connected to a telephone set, in the normal manner. However, in the present invention, the seize message contains a ring type obtained from memory 12 related to this call.

The peripheral controller, recognizing that a ring type has been sent, accesses memory 23 and particularly the ring data associated with the ring type table 25 stored in memory 23, and receives the sequence of on-off indicators, i.e. the cadences, indicated by the ring table for the designated ring type. The peripheral controller then rings the called line 8 using that cadence.

In the case that a call has been transferred in accordance with the above-identified patent application, the transfer message can contain the ring type designated for the transferring call. In that case the main controller sends the already designated ring type with the seize message. The ring type may be recognized by the transferring party when he hears the ring of telephone set 7 at the transferred location.

Alternatively, the data received by the main controller relating to the transferring calls could instead relate to station data which both designates the transferring party, and unique ring type, and also designates the particular directory number of the transfer target telephone to be rung. In that case the main controller will look up the designated station data relating to the transferring party in table 13 of memory 12, extract both the ring type and target station number, and process the call using that data, as if it were a call as described relating to the first embodiment noted above, but with a different ring type (since a separate table 13 would exist relating to the transferring party).

If there are two lines at the subscriber location each of which having a different directory number, these calls are processed as if they were separate calls leading to separate subscriber lines, as described above relating to the first embodiment. However in this case specifically different ringing cadences are chosen in order to clearly distinguish one from the other. Thus for example one telephone line would be chosen to be rung with ring type R1 and the other with ring type R4. The station data stored in memory 12 would thus contain different ring types 15.

Because the ring types can be easily established for each caller on one or plural lines by an installer working at a terminal connected to bus 5 this provides the ability for a subscriber to choose whatever ring cadence the subscriber prefers, which can be an additional sales feature provided by the telephone company.

It will be recognized that memory 12 can be combined with memory 3, and that the ring type 15 can be incorporated in user data tables which may already exist in memory 3. Further, memory 23 can be combined with a memory which may already exist and which is accessible by controller 9.

Certain subscribers have several lines which the telephone line designates as equivalents. For example, there may be two professionals using a single receptionist. In order to avoid constant busy signals when a particular professional, having a particular directory number is using the telephone, the two professionals may decide to purchase line equivalence from the telephone company. In line equivalence, when one line is busy, the other is automatically rung.

In this type of circumstance, the professionals have two choices as to directory numbers. Either both can advertise the same directory number, or each can have a separate directory number. In the second case, the receptionist could answer the first call to the professional using that professional's business name. However with line equivalence, once a second line is rung, it is impossible to know whether that call is to the second professional, or is a second call to the first professional. The receptionist cannot then answer the call in a professional manner, designating the proper business name.

Further, if both professionals use the same directory number, it is impossible to answer incoming calls using the proper business name, since it is unknown to which professional the call is intended.

Using the present invention, each of the professionals can maintain separate unique directory numbers. Line equivalence can be used, which can reduce the number, and therefore the cost of telephone lines since the telephone lines are used more efficiently. However since telephone calls designated for each professional causes an unique ringing cadence, no matter which of the two lines is rung, the receptionist can answer either line with the appropriate name, knowing which business is designated by the ringing sequence.

A person understanding this invention may now conceive of alternative structures and embodiments or variations of the above. All of those which fall within the scope of the claims appended hereto are considered to be part of the present invention.

I claim:

1. A method of ringing a telephone line comprising:

(a) receiving a request for service to a first telephone line, the request being identified by a first directory number, (b) looking up in a table containing a plurality of ringing sequences, a first particular ringing sequence which is allocated to the first directory number, and (c) applying the first particular ringing sequence to a subscriber's line which terminates at the first telephone, and ringing the first telephone in the first particular ringing sequence.

2. A method as defined in claim 1 in which a first subscriber is registered against the first telephone line, a second subscriber is registered against a second telephone line which is terminated on one of the same or on a different switching system as the first telephone, and in which the second subscriber is identified by the first directory number and a second particular ringing sequence, and ringing the telephone registered to the first subscriber using the second particular ringing sequence identifying the second subscriber in the event a request for service is received to the directory number of the second subscriber.

3. A method as defined in claim 2, in which the identification of the second subscriber is a table temporarily stored in a memory associated with the switching system on which the first subscriber's line is terminated, the identification containing a ringing cadence identifier of the second subscriber.

4. A method of ringing a telephone from a central processor controlled switching system comprising:

(a) storing in a first memory associated with a central control of said switching system a ringing type indicator associated with a particular telephone line identified by a directory number, (b) storing in a second memory associated with a peripheral control of said switching system a group of different ringing cadence indicators, (c) receiving a request for service to a first telephone station by the central control, (d) the central control reading the first memory and obtaining a ringing type indicator associated with the first telephone station, (e) sending a seize message to the peripheral control with an identification of the ring type, (f) the peripheral control reading the second memory, obtaining ringing cadence indicators corresponding to the ring type, and ringing the telephone line using an identified ringing cadence.

5. A method as defined in claim 4, in which different ringing cadences are associated with different directory members, a single telephone station being rung with different ringing cadences when different directory numbers are registered and associated with a single telephone station line, depending on which of the different directory numbers has been requested for service.

6. A method as defined in claim 5, in which at least one of the different directory numbers registered and associated with a telephone station line is temporary, said one different directory number being registered and associated with the telephone station line upon request for a special service by a remote subscriber having enacted a call transfer request directed to the telephone station line as a target line.

7. A method as defined in claim 4, in which a particular subscriber has more than one directory number and more than one telephone, each identified by a different directory number, the ringing type indicators stored in the first memory being different for each directory number registered and associated to the particular subscriber, whereby each of said more than one telephone is rung with a different ringing cadence.

* * * * *